May 27, 1958   E. W. D'ARCY ET AL   2,836,423
SOUND HEAD UNIT OF A MOTION PICTURE PROJECTING
AND SOUND REPRODUCING APPARATUS
Filed July 13, 1953   4 Sheets-Sheet 1

INVENTOR.
ELLIS WELLINGTON D'ARCY
GEORGE F. KETOUS
BY
THEIR ATTORNEY

May 27, 1958 E. W. D'ARCY ET AL 2,836,423
SOUND HEAD UNIT OF A MOTION PICTURE PROJECTING
AND SOUND REPRODUCING APPARATUS
Filed July 13, 1953 4 Sheets-Sheet 2

INVENTOR.
ELLIS WELLINGTON D'ARCY
GEORGE F. KRTOUS
BY
THEIR ATTORNEY.

May 27, 1958 E. W. D'ARCY ET AL 2,836,423
SOUND HEAD UNIT OF A MOTION PICTURE PROJECTING
AND SOUND REPRODUCING APPARATUS
Filed July 13, 1953 4 Sheets-Sheet 3

INVENTOR.
ELLIS WELLINGTON D'ARCY
AND GEORGE F. KRTOUS
BY
THEIR ATTORNEY

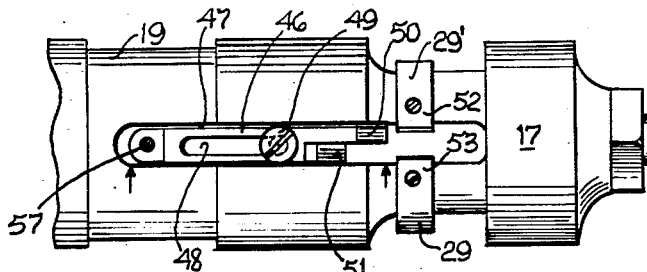
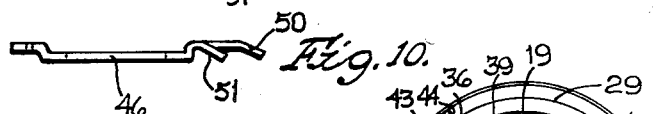
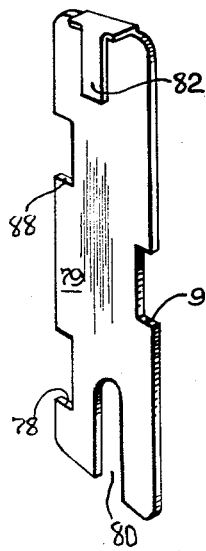
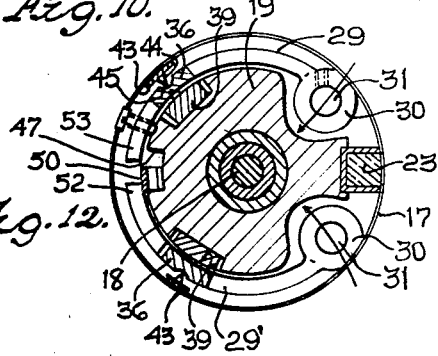
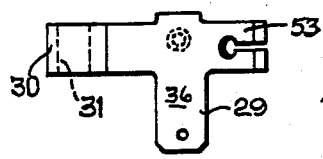
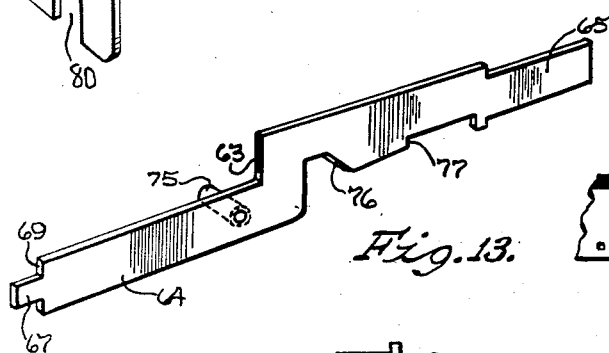
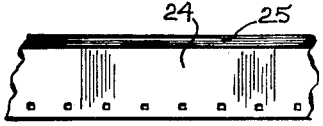
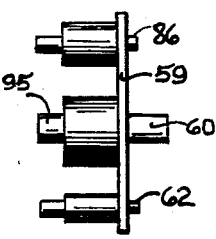

United States Patent Office 2,836,423
Patented May 27, 1958

2,836,423

SOUND HEAD UNIT OF A MOTION PICTURE PROJECTING AND SOUND REPRODUCING APPARATUS

Ellis Wellington D'Arcy and George F. Krious, Chicago, Ill., assignors to De Vry Corporation, Chicago, Ill., a corporation of Illinois Application July 13, 1953, Serial No. 367,482

4 Claims. (Cl. 274—4)

Our invention relates to a sound head unit of a motion picture projecting and sound reproducing apparatus and has for its principal object an arrangement for optionally recording, reproducing, or erasing sound from a paramagnetic sound track of a film or the like.

Another and equally important object of the invention is the provision of a simple and inexpensive combination of elements for accomplishing the above-stated object.

Summarily, it is one of the several objects of the invention to provide a recording electromagnet and an eraser electromagnet with a sound reproducing head of a motion picture projecting machine in a manner such that permits either or both of the electromagnets to be moved into a retracted position with respect to the sound track of the film, by means of an arrangement which is simple in construction and easy of operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 9 is a fragmentary sectional detail view substantially on line 9—9 of Fig. 6;

Fig 10 is a side elevational view of a slide bar embodied in the invention;

Fig. 11 is a perspective view of a latch plate embodied in the invention, as viewed in the direction of the arrows in Fig. 9;

Fig. 12 is a fragmentary sectional detail view taken substantially on line 12—12 of Fig. 8;

Fig. 12A is a top plan view of an electromagnet mounting arm embodied in the invention;

Fig. 13 is a perspective view of a latch bar embodied in the invention;

Fig. 14 is an edge view of a rocker arm embodied in the invention;

Fig. 15 is a fragmentary plan view of a film showing one edge thereof coated with a paramagnetic material.

Figure 1:
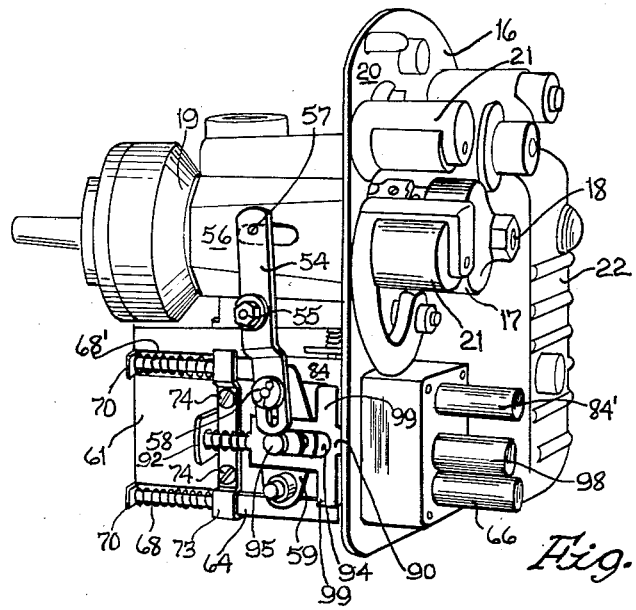
Fig. 1 is a perspective view of a magnetic sound pick-up recorder head showing my invention associated therewith.

The present invention constitutes an improvement over the magnetic sound pick-up recorder head and support therefor shown in the pending application of Ellis Wellington D'Arcy, one of the co-inventors of the present invention, and which application bears Serial No. 296,658.

In the present application we have illustrated a sound head unit 16 which is adapted to be assembled in its proper place to a wall of a motion picture sound reproducing apparatus. Such sound head unit comprises a sound drum 17 mounted on a drive shaft 18 journaled in a bearing structure 19 and driven in a manner well-known in the art. On the face plate 20 of the unit 16 are mounted the conventional film guide and stabilizer rollers 21 which cooperate to properly track the film around the sound drum 17. Also mounted on this face plate 20 is the exciter lamp housing 22, the exciter lamp of which coordinates with a light shaft 23 of a construction and for a purpose set forth and described in Patent No. 2,617,892.

Figure 7:
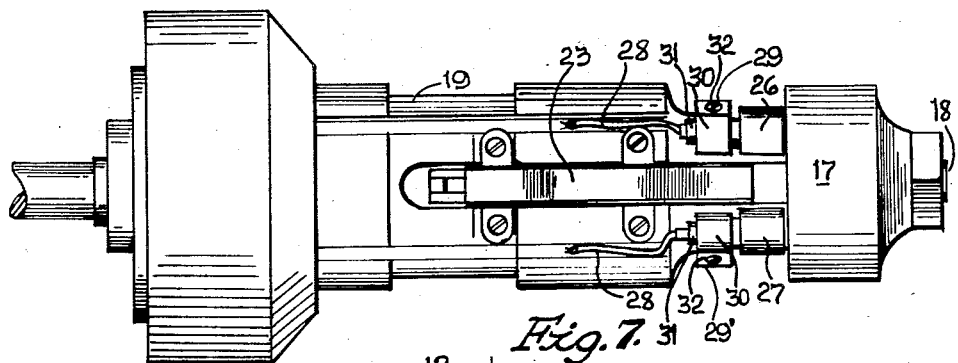
Fig. 7 is an elevational view of the reverse side of the bearing assembly as shown in Fig. 6.
Figure 8:
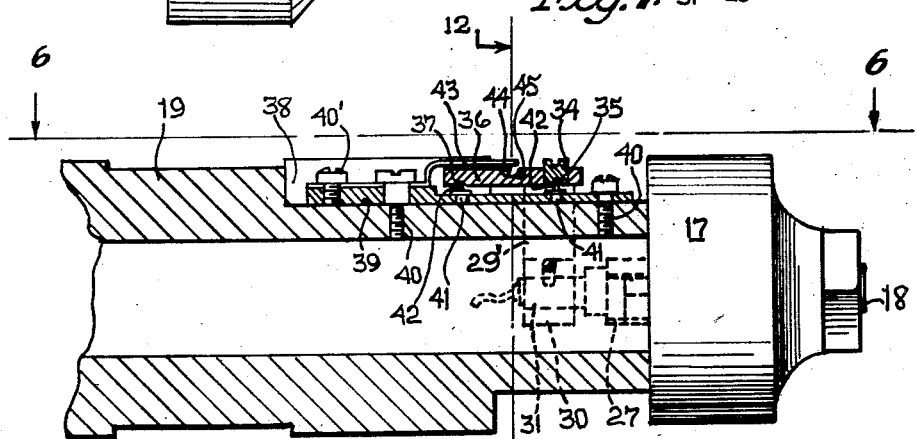
Fig. 8 is a fragmentary sectional detail view taken substantially on line 8—8 of Fig. 6, drawn to slightly enlarged scale.

The film which is adapted to pass around the drum 17 is shown in Fig. 15. Such film 24 is of a conventional construction, having along one longitudinal edge a sound track 25 which is formed of paramagnetic material. The width of this film 24 is such that the sound track 25 will extend laterally beyond the adjacent periphery of the sound drum 17 where it will be exposed to the recorder electromagnet 26 and to the eraser electromagnet 27 (Fig. 7). These magnets are preferably of the electromagnetic type, each having a suitable circuit wire 28 for connection with a suitable control circuit (not shown).

Each of these electromagnets 26 and 27 is mounted on an arm 29 and 29', respectively, of similar construction. In the present instance and in the preferred form of construction, each of these arms 29 and 29' provides a bearing 30 which receives the stud shaft 31 carrying the electromagnet, and which stud shaft is fixedly secured in the bearing by a set screw 32. The end 33 of the arm 29 (as well as 29') carries a set screw 34, the inner end of which has a frusto-conically shaped recess 35. Each of the arms 29 and 29' also provides an inner lateral extension 36, the underside of which is also provided with a frusto-conically shaped recess 37. Mounted in a cut-out portion 38 of the bearing 19 is a mounting plate 39 secured to the bearing by suitable screws 40. Carried by this plate 39 are pins 41 having substantially cone-shaped heads 42 which project into the recesses 35 and 37 and cooperate with the latter to rockably mount the arm on the mounting plate 39. Such arms are each held in position upon their respective supporting pins 41 by means of a spring leaf 43 having at one end portion a substantially conically shaped pin 44 engaging in a depression 45 formed in the arm. The spring leaf 43 is connected to the plate 39 by means of the screws 40 and a screw 40'.

Where the term "effective position" appears in the specification herein, it is to be understood that such position is the position of the electromagnet with respect to the sound track where it performs its respective function—for example, when the recorder electromagnet 26 is in effective position, the apparatus is conditioned for sound reproduction, and when it is in an ineffective position, the apparatus is rendered inoperative for sound reproduction.

As hereinbefore stated, means is provided for optionally retracting either or both of the electromagnets from effective position with respect to the sound track. In the present instance, such means in its preferred form of construction includes a slide bar 46 mounted for movement in the direction of its length in a recess 47 formed in the adjacent portion of the bearing structure 19. This bar 46 includes an elongated slot 48. Projecting through this slot 48 is a head-bearing pin 49 which serves to limit and guide the movement of the bar 46. One end portion of this bar 46 provides cam fingers 50 and 51.

As shown in Fig. 12, the arms 29' and 29 are concentrically arranged with respect to the bearing structure 19, with their ends 52 and 53 Fig. 9, in spaced relation with respect to each other and in the path of the cam fingers 50 and 51, respectively. The hill portion of each of these cam fingers 50 and 51 is such that when moved into engagement with the ends 52 and 53 of the arms 29' and 29, such arms will be rocked radially with respect to the bearing structure 19 about their position upon pins 41 of the plate 39, Fig. 12, to dispose the electromagnets 27 and/or 26 in ineffective position with respect to the sound track 25, which position will be with the electromagnet in spaced relation with respect to the film track 25.

By reason of the offset relation in a longitudinal direction between the cam fingers 50 and 51, it will be manifest that the cam finger 50 will engage its respective end 52 of the arm 29', before the cam finger 51 engages its respective end 53 of the arm 29. By such arrangement, the eraser electromagnet 27 may be disposed in ineffective position with respect to the sound track while the recorder electromagnet 26 is in effective position with respect to the sound track. Such arrangement also permits both of such electromagnets to be held in ineffective position with respect to the sound track. These accomplishments result from the longitudinal movement of the bar 46 in a direction to dispose the cam fingers 50 and 51 into engagement with the ends 52 and 53, respectively, of the arms 29' and 29. In such position of the electromagnets the apparatus is effective for picture or optical projection only. In viewing Fig. 12, when the end 50 of the bar 46 is moved longitudinally in the recess 47 in the direction of the viewer, the end 50 will engage the end 52 of the arm 29' and pivot it away from the center of the bearing 19. The arm 29' will, by the movement of the bar 46 be rocked upon the pins 41 of the plate 39 and the opposite end thereof forming the bearing 30 which carries the stud shaft 31 of the electromagnet will be pivoted in the direction of the arrow toward the center of the bearing 19 and out of engagement with the film track 25.

The means for sliding this bar 46 longitudinally in its groove 47 includes a lever 54 pivoted substantially midway between its opposite ends as at 55 to a body 56 formed as an integral part of the face plate 16 and in which body the bearing structure 19 is fixedly mounted.

The upper end portion of this lever 54 is pivoted as at 57 to the adjacent end of the bar 46. The opposite end portion of the lever 54 is pivoted by means of a slot and pin connection 58 to one end portion of a rocker arm 59. This rocker arm 59 substantially midway between its end portions is pivoted by a pintle 60 to a wall 61 preferably though not necessarily formed as an integral part of the body 56.

Extending rearwardly of the rocker arm 59 adjacent the lower end thereof is a stud 62 adapted to be engaged by a shoulder 63 of a latch bar 64 (Fig. 13). At its outer end the latch bar 64 provides a reduced shank 65 to which is secured a finger button 66.

Figure 5:
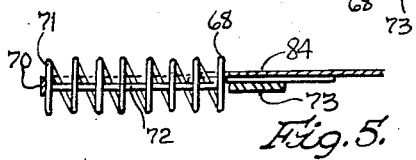
Fig. 5 is a fragmentary sectional detail view taken substantially on line 5—5 of Fig. 3.
Figure 6:
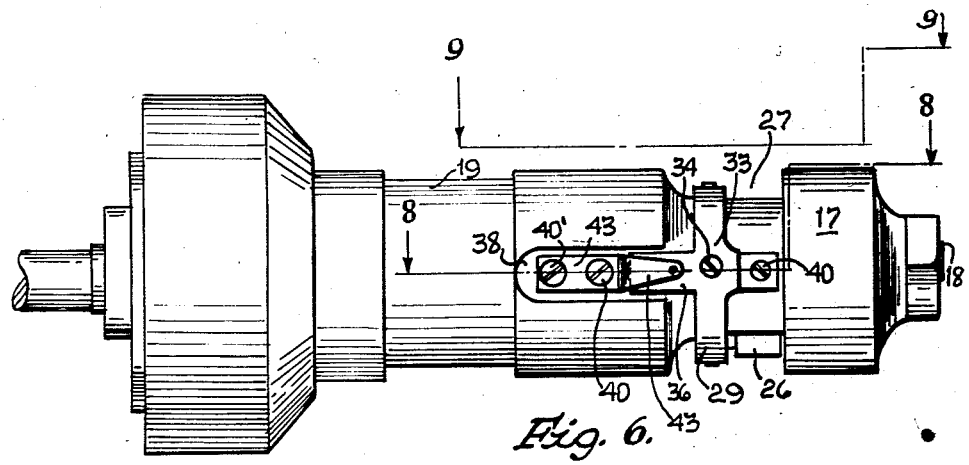
Fig. 6 is an elevational view of a bearing assembly embodied in the invention, showing the same removed from mounted position, and taken substantially on line 6—6 of Fig. 8.

The inner end of the bar 64 provides a reduced extension 67 which projects into the end of a coil spring 68 with the end 69 of the bar 64 engaging an adjacent coil of such spring. This spring is supported from the wall 61 preferably in the manner shown in Fig. 5. In this connection, the wall 61 provides a lateral extension 70 against which the end 71 of the coil spring 68 abuts. Extending from this extension 70 is a guide rod 72 embraced by the spring 68. A bracket 73 (Fig. 2) is secured to the wall 61 as at 74, to provide a guide for the latch bar 64.

Intermediate the end portions of the bar 64 is a pin 75 which is adapted to engage the plate 73 to limit the inward movement of the bar 64. Also intermediate the end portions of the bar 64 there is provided a cam edge 76 and adjacent thereto in an outward direction is a latch shoulder 77 (Fig. 13). The cam edge 76 is adapted to engage the step portion 78 of a latch plate 79 (Fig. 11). When the latch shoulder 77 is moved to pass over the stepped portion 78, such stepped portion 78 will engage behind the shoulder 77 and latch the bar 64 in an inward projected position.

The latch plate 79 is supported for vertical movement by means of a slot and pin connection 80 (Fig. 2) and a lateral extension 81, the latter having a slot through which a returned end portion 82 of the bar moves. A spring 83 is provided to bias the latch plate 79 in an upward direction or latched position with respect to the bar 64.

Figure 2:
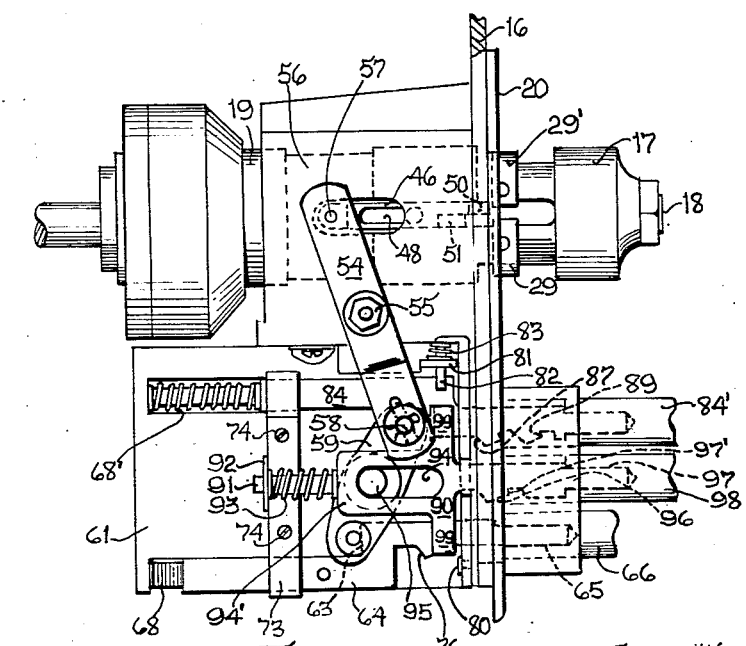
Fig. 2 is a side elevational view of the same as seen in Fig. 1, with the film rollers and exciter lamp housing removed.

When the bar 64 is in an inner projected position as shown in Fig. 2, the rocker arm 59 will be moved to the position there shown and will pivot the lever 54 in an anticlockwise direction, as viewed in Fig. 2. Such pivotal movement of the lever 54 moves the slide bar 46 to its innermost position shown in Fig. 10, in which position both of the cam fingers 50 and 51 are disposed from engagement with the end portions 52 and 53 of the arms 29' and 29, respectively. In this position of the arms, both electromagnets are disposed in effective position with respect to the sound track. In such position of the electromagnets, the apparatus is effective for recording only.

Figure 3:
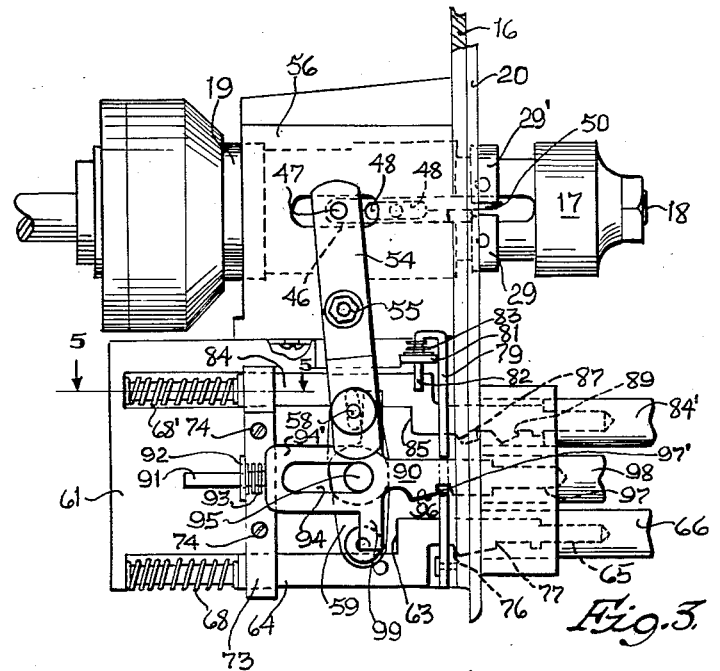
Fig. 3 is a side elevational view similar to that shown in Fig. 2, but showing the parts thereof in different positions.
Figure 4:
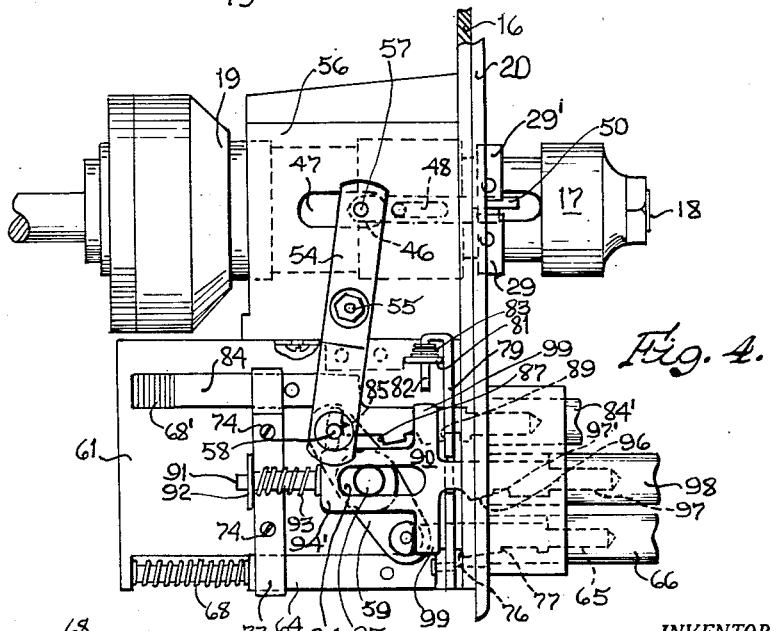
Fig. 4 is a side elevational view similar to Figs. 2 and 3, but showing the parts thereof in different positions.

The lever 54 is pivoted in an opposite or clockwise direction by a bar 84 similar in construction to the latch bar 64 and similarly mounted on the wall 61. The latch bar 84, as seen in Figs. 2 to 4 inclusive, has a finger button 84' and a shoulder 85 which is adapted to engage a stud 86 (Fig. 14) carried at the upper end portion of the rocker arm 59 and extending rearwardly therefrom.

Such bar 84 provides a cam edge 87 which is adapted to engage a stepped portion 88 of the latch plate 79 (Fig. 11) when such bar 84 is moved inwardly against the action of its spring 68', similar to the spring 68 and mounted to the wall 61 in a similar manner. The engagement of the cam edge 87 with the stepped portion 88 will move the latch plate 79 downwardly against the action of the spring 83 to dispose the shoulder 77 from engagement with the stepped portion 78, thereby to release the bar 64 for return to its outer projected position under the action of its spring 68.

In its innermost projected position the bar 84 (like the bar 64) is latched to the latch plate 79 by the latch shoulder 89. When this bar 84 is projected to its innermost position, the shoulder 85 will move into engagement with the stud 86 and rock the rocker arm 59 in an anticlockwise direction as viewed in Fig. 2, to pivot the lever 54 in a clockwise direction as viewed in Fig. 2. Such pivotal movement of the lever 54 will move the slide bar 46 outwardly, bringing the cam finger 51, as well as the cam finger 50, into engagement with the ends 53 and 52, respectively, of the arms 29 and 29', whereby to rock these arms concentrically with respect to the bearing structure 19, to dispose both of the electromagnets 26 and 27 in an ineffective position with respect to the sound track 25. In this position of the electromagnets the apparatus is conditioned for optical projection only.

Substantially intermediate the bars 64 and 84 is a bar 90 having a reduced extension 91 slidable through an outwardly turned lip 92 provided by the bracket 73. Embracing this extension is a spring 93, the inner end of which abuts a portion 94' of the bar 90. Such portion provides an elongated opening 94 through which projects a stud 95 and cooperating with the opening 94 to abut the portion 94' to provide a guide for the longitudinal movement of the bar 90. The outer end of this bar 90 is similar to the outer end of the bar 64 in construction and (like the bar 64) it provides a cam edge 96 which is adapted to engage a shoulder 96' of the latch plate 79 to move the latch plate downwardly against the action of the spring 83. Adjacent this cam edge 96 is provided a latch shoulder 97' which, when the bar 90 is in its inner projected position, is adapted to engage the shoulder 96' to latch the bar 90 in such position.

To an extension 97 of the bar 90 is mounted a finger button 98. The bar 90 provides oppositely aligned arms 99 which are adapted to engage either of the studs 62 and 86 to effect pivotal movement of the rocker arm 59 to the position shown in Fig. 3. The rocker arm 59 when pivoted to this position will have pivoted the lever 54 to a position where the bar 46 has been moved outwardly longitudinally to dispose the cam finger 50 into engagement with the end 52 of the arm 29', whereby to rock this arm 29' in a direction to dispose the recorder electromagnet 26 from effective position with respect to the sound track 25. In this position of the electromagnet 26, the apparatus is conditioned for eraser operation of the sound track.

Summarily, the foregoing construction provides a simple and inexpensive arrangement for accomplishing or conditioning the apparatus for the following operation or function:

(1) When the cam fingers 50 and 51 are in retracted position, as shown in Figs. 2 and 10, both electromagnets are disposed in effective position with respect to the sound track, with the result that the apparatus is conditioned for recording only.

(2) When the cam finger 50 is in engagement with the end portion 52 of the arm 29' and the cam finger 51 is out of engagement with the end portion 53 of the arm 29, the apparatus is conditioned for eraser operation of the sound track.

(3) When the cam fingers 50 and 51 are in engagement with the ends 52 and 53 of the arms 29' and 29, respectively, both electromagnets are disposed from effective position with respect to the sound track and the apparatus is therefore conditioned for picture or optical projection only.

In accomplishing the foregoing functions and operations, we have provided a device which is easy of operation and one which requires a minimum of effort in its operation.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. In a mechanism of the class described, the combination with a sound drum, a shaft therefor, a circular bearing structure for the shaft and a film passing over the sound drum and having on one longitudinal edge a paramagnetic material, of a pair of spaced apart arms on opposite sides of the bearing structure in concentric relation with respect thereto and adjacent the periphery of the drum, means for supporting each of said arms on said bearing structure for rocking movement radially with respect to the drum, means common to said arms for selectively rocking one or both of said arms in said radial direction to vary the position of corresponding adjacent end portions of the arms with respect to the track, an eraser electromagnet carried by one of said corresponding end portions of one of said arms, a recorder electromagnet carried by the other corresponding end portion of the other of said arms, means for releasably latching one or both of said arms in an adjusted position in said radial direction, and manually operated means for effecting operation of said means for rocking said arms and for releasing said arms for rocking movement in a direction to space said corresponding end portions of said arms from said track.

2. In combination with a circular bearing structure, a sound drum carried by said structure for rotation coaxially with respect thereto, a pair of arcuated arms concentrically arranged with respect to said circular bearing structure, means for rockably mounting said arms on said bearing structure with opposite corresponding end portions of the arms in spaced relation with respect to each other, an eraser electromagnet carried by one of said arms at the end thereof, a recorder electromagnet carried by the other of said arms at the end thereof, spring means for manitaining said arms on their mounting means to dispose said electromagnets in effective position with respect to said track, an elongated slidable member common to corresponding opposite ends of said arms and mounted for longitudinal movement with respect to said bearing structure and having cam fingers oppositely disposed with respect to each other and spaced in a longitudinal direction and movable into engagement with the corresponding ends of said arms opposite the ends carrying said electromagnets for rocking said arms upon their mounting means in a direction to space the electromagnets from said track, and means for moving said member to selectively move the cam fingers from and into engagement with said corresponding end portions of said arms.

3. In combination with a circular bearing structure, a sound drum carried by said structure for rotation coaxially with respect thereto, a pair of arcuated arms concentrically arranged with respect to said circular bearing structure, means for rockably mounting said arms on said bearing structure with opposite corresponding end portions of the arms in spaced relation with respect to each other, an eraser electromagnet carried by one of said arms at the end thereof, a recorder electromagnet carried by the other of said arms at the end thereof, spring means for maintaining said arms on their mounting means to dispose said electromagnets in effective position with respect to said track, an elongated slidable member common to corresponding opposite ends of said arms and mounted for longitudinal movement with respect to said bearing structure and having cam fingers oppositely disposed and in spaced relation with respect to each other and movable into engagement with the corresponding ends of said arms opposite the ends carrying said electromagnets for rocking said arms upon their mounting means in a direction to space the electromagnets from said track, means for moving said member to selectively move the cam fingers from and into engagement with said corresponding end portions of said arms, and means for releasably latching said elongated member in predetermined positions with respect to said bearing structure.

4. In combination with a circular bearing structure, a sound drum carried by said structure for rotation coaxially with respect thereto, a pair of arcuated arms concentrically arranged with respect to said circular bearing structure, means for rockably mounting said arms on said bearing structure with opposite corresponding end portions of the arms in spaced relation with respect to each other, an eraser electromagnet carried by one of said arms at the end thereof, a recorder electromagnet carried by the other of said arms at the end thereof, spring means for maintaining said arms on their mounting means to dispose said electromagnets in effective position with respect to said track, an elongated slidable member common to corresponding opposite ends of said arms and mounted for longitudinal movement with respect to said bearing structure and having cam fingers oppositely disposed and in spaced relation with respect to each other and movable into engagement with the corresponding ends of said arms opposite the ends carrying said electromagnets for rocking said arms upon their mounting means in a direction to space the electromagnets from said track, means for moving said member to selectively move the cam fingers from and into engagement with said corresponding end portions of said arms, means for releasably latching said elongated member in predetermined positions with respect to said bearing structure, and manually operated means for releasing said latch means and for effecting operation of said means for moving said elongated member.

References Cited in the file of this patent

UNITED STATES PATENTS

| | | |
|---|---|---|
| 2,335,586 | De Sart | Nov. 30, 1943 |
| 2,410,569 | Conant | Nov. 5, 1946 |
| 2,613,939 | Moore | Oct. 14, 1952 |
| 2,647,755 | Townsley | Aug. 4, 1953 |
| 2,654,809 | Camras | Oct. 6, 1953 |
| 2,658,951 | Albee | Nov. 10, 1953 |
| 2,705,640 | Del Valle | Apr. 5, 1955 |
| 2,709,596 | Pettus | May 31, 1955 |